(12) United States Patent
Tanaka

(10) Patent No.: US 8,620,090 B2
(45) Date of Patent: Dec. 31, 2013

(54) LINE DETERMINATION APPARATUS, LINE DETERMINATION METHOD, AND COMPUTER-READABLE MEDIUM

(75) Inventor: Eiichi Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 230 days.

(21) Appl. No.: 13/090,807

(22) Filed: Apr. 20, 2011

(65) Prior Publication Data

US 2012/0099797 A1 Apr. 26, 2012

(30) Foreign Application Priority Data

Oct. 26, 2010 (JP) ................................ 2010-239389

(51) Int. Cl.
*G06K 9/46* (2006.01)
(52) U.S. Cl.
USPC ........... 382/202; 382/100; 382/181; 382/183; 382/190; 382/282
(58) Field of Classification Search
USPC ................. 382/100, 181, 183, 190, 202, 282
See application file for complete search history.

(56) References Cited

U.S. PATENT DOCUMENTS

| | | | | |
|---|---|---|---|---|
| 5,293,429 A | * | 3/1994 | Pizano et al. | 382/202 |
| 5,448,653 A | * | 9/1995 | Hori et al. | 382/202 |
| 6,945,550 B2 | * | 9/2005 | Williams | 280/506 |
| 6,975,762 B2 | * | 12/2005 | Katsuyama | 382/202 |
| 2005/0031208 A1 | * | 2/2005 | Ohara et al. | 382/202 |
| 2007/0140565 A1 | * | 6/2007 | Lin et al. | 382/203 |
| 2010/0310178 A1 | * | 12/2010 | McCandlish et al. | 382/202 |

FOREIGN PATENT DOCUMENTS

JP A-08-016782 1/1996

OTHER PUBLICATIONS

Aurélie Lemaitre and Jean Camillerapp, "Text Line Extraction in Handwritten Document with Kalman Filter Applied on Low Resolution Image", IEEE, Proceedings of the Second International Conference on Document Image Analysis for Libraries, 2006, pp. 38-45.*
Ivan Leplumey, Jean Camillerapp and Charles Queguiner, "Kalman Filter Contributions Towards Document Segmentation", IEEE, Proceedings of the Third International Conference on Document Analysis and Recognition, 1995, vol. 2 pp. 765-769.*

* cited by examiner

*Primary Examiner* — Eric Rush
(74) *Attorney, Agent, or Firm* — Oliff & Berridge, PLC

(57) ABSTRACT

An image processing apparatus includes a line information reception unit, a prediction determination unit, a feature amount calculation unit and a line determination unit. The line information reception unit receives a set of information indicating (i) information on an image having a possibility of being line and (ii) line element being a rectangular pixel lump constituting a line. The prediction determination unit determines whether or not a target line element matches a predicted value based on the received information. The predicted value indicates line element which is predicted when the target line element constitutes a line. The feature amount calculation unit calculates feature amount of the image when the prediction determination unit determines the target line element does not match the predicted value. The line determination unit determines whether or not the image is a line based on the calculated feature amount.

7 Claims, 10 Drawing Sheets

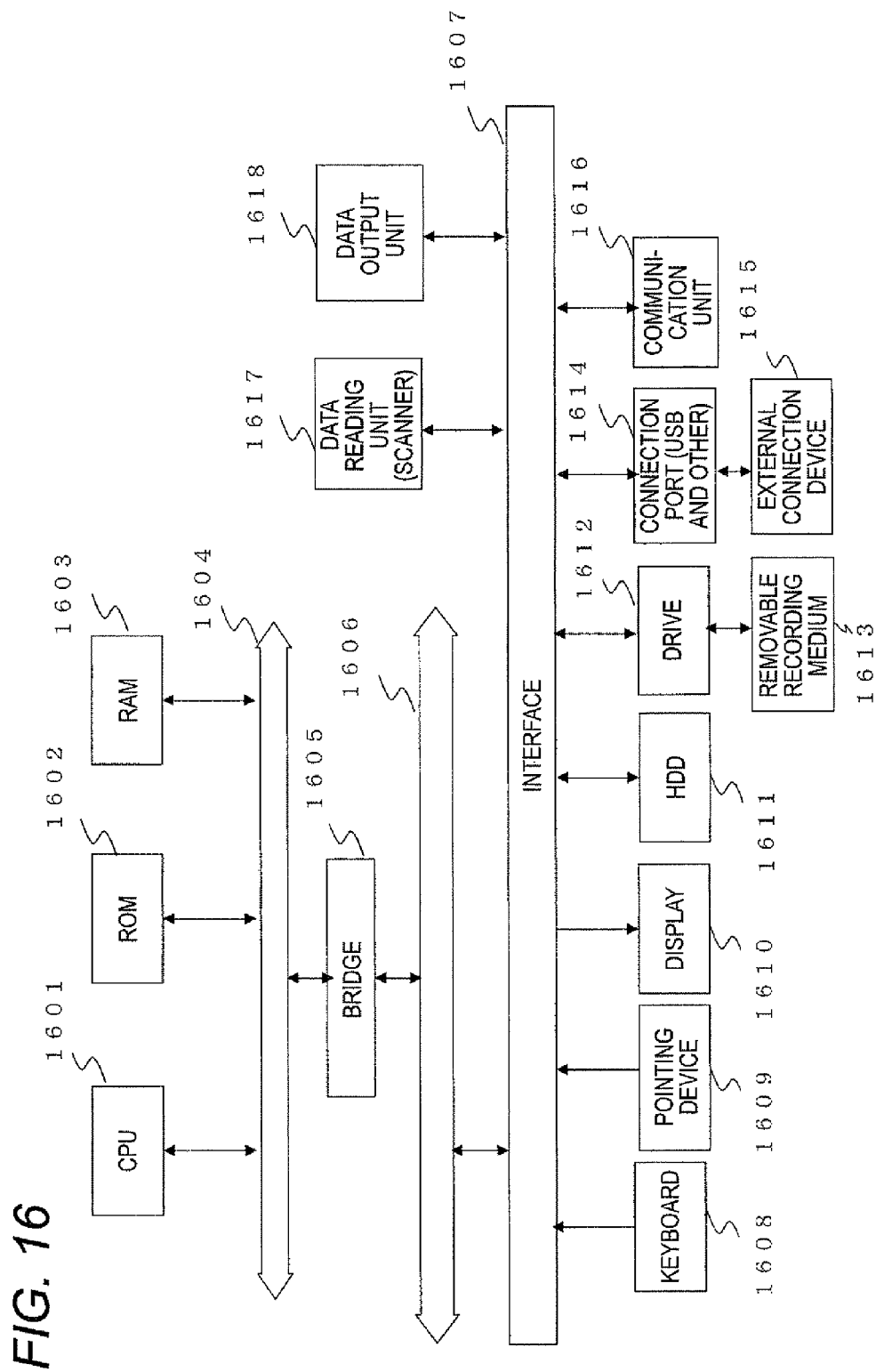

LINE DETERMINATION APPARATUS, LINE DETERMINATION METHOD, AND COMPUTER-READABLE MEDIUM

CROSS-REFERENCE TO RELATED APPLICATION

This application is based on and claims priority under 35 USC119 from Japanese Patent Application No. 2010-239389 filed on Oct. 26, 2010.

BACKGROUND

1. Technical Field

The present invention relates to an image processing apparatus, an image processing method and a computer-readable medium.

2. Related Art

Techniques for extracting line segments from an image are known in the art.

SUMMARY

According to an aspect of the invention, an image processing apparatus includes a line information reception unit, a prediction determination unit, a feature amount calculation unit and a line determination unit. The line information reception unit receives a set of information indicating (i) information on an image having a possibility of being line and (ii) line element being a rectangular pixel lump which constitutes a line. The prediction determination unit determines whether or not a target line element matches a predicted value of the target line element based on the information indicating the line element received by the line information reception unit. The predicted value indicates line element which is predicted when the target line element constitutes a line at a position of the target line element. The feature amount calculation unit calculates feature amount of the image when the prediction determination unit determines the target line element does not match the predicted value. The line determination unit determines whether or not the image is a line based on the feature amount calculated by the feature amount calculation unit.

BRIEF DESCRIPTION OF THE DRAWINGS

Exemplary embodiment of the invention will be described in detail based on the following figures, wherein:

FIG. 3 is an explanatory view illustrating an example image read from a scanner or the like;

FIG. 16 is a block diagram illustrating an example hardware configuration of a computer implementing this embodiment.

DETAILED DESCRIPTION

Hereinafter, various exemplary embodiments suitable for realizing the invention will be described with reference to the drawings.

Figure 1:
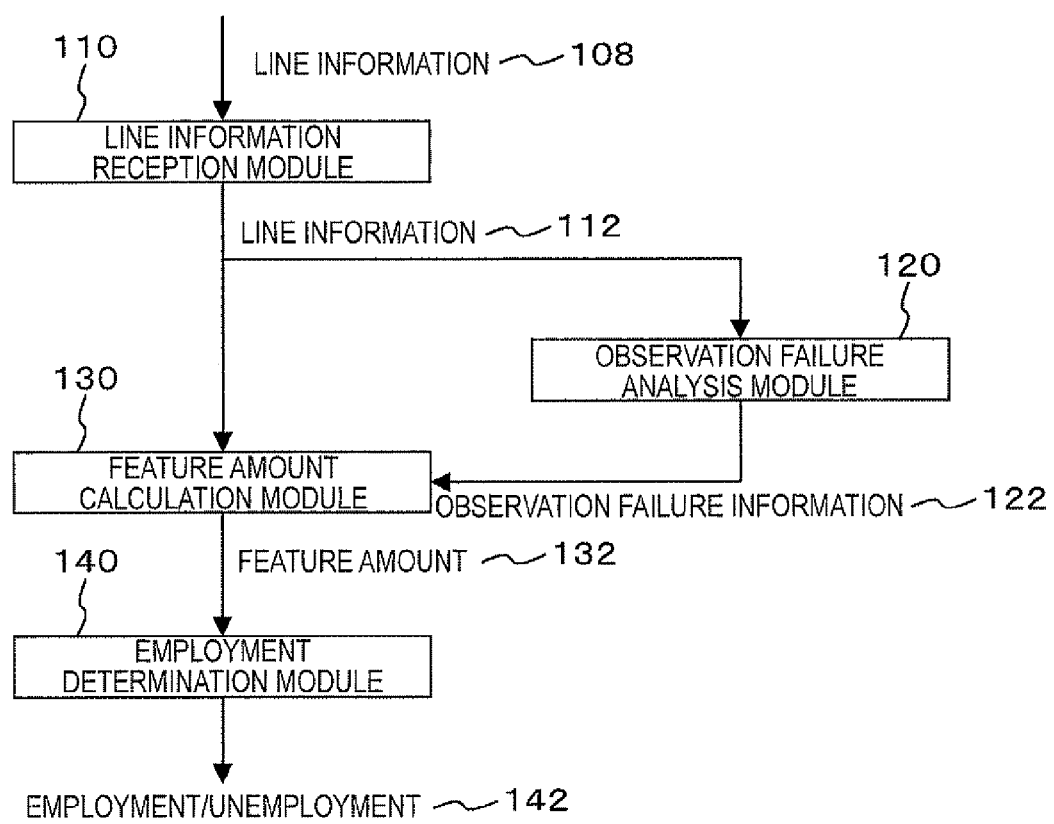
FIG. 1 is a conceptual module configuration view of an example configuration according to a first embodiment.

FIG. 1 is a conceptual module configuration view of an example configuration according to a first embodiment.

A "module" used herein refers generally to a part such as logically separatable software (computer program), hardware, and so on. Accordingly, a module in this embodiment includes not only a module in a computer program but also a module in hardware configuration. Thus, this embodiment describes all computer programs (including a program which causes a computer to execute steps, a program which causes a computer to function as means, and a program which causes a computer to realize functions) that cause this embodiment to function as modules, the system, and method. For the purpose of convenience of description, as used herein, "store," "be stored" or the equivalents thereof mean that a computer program is stored in a storage device or is controlled to be stored in a storage device when the embodiment is related to the computer programs. Although the module is in one-to-one correspondence with a function, when it comes to mounting, one module may be configured as one program, a plurality of modules may be configured as one program, or one module may be configured as a plurality of programs. A plurality of modules may be executed by one computer, or one module may be executed by a plurality of computers in distributed or parallel environments. One module may contain other modules. As used herein, the term "connection" includes logical connections (data delivery, instruction, reference relation between data, and so on) in addition to physical connections. As used herein, the term "predetermined" means determination before an object process, including not only determination before the start of processing by the embodiment but also determination according to situations and condition at that time or situations and condition up to that time when this determination is determination before an object process even after the start of processing by the embodiment.

As used herein, the term "system" or "apparatus" includes one computer, hardware, apparatus, and the like in addition to a plurality of computers, hardware, apparatuses, and the like interconnected via communication means such as a network (including one-to-one correspondence communication connection). In the specification, "apparatus" is synonymous with "system." Of course, the "system" does not include anything that is merely a social "structure" (social system) that is an artificial decision.

When different modules perform different processes or one module performs different processes, information intended for processing is read from a storage unit and a result of the processing is written in the storage unit. Thus, explanation regarding reading information out of the storage unit before processing and writing information in the storage unit after processing may be omitted. A storage unit used herein may include a hard disk, a random access memory (RAM), an external storage medium, a storage unit via a communication line, a register within a central processing unit (CPU), and so on.

An image processing apparatus of the first embodiment determines whether or not a target image corresponds to a line and includes a line information reception module 110, an observation failure analysis module 120, a feature amount calculation module 130 and an employment determination module 140, as shown in the example of FIG. 1.

First, a target image in the first embodiment will be described.

Figure 2:
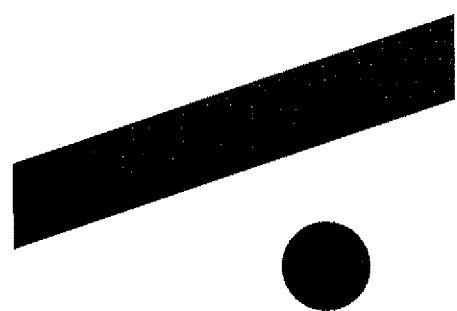
FIG. 2 is an explanatory view illustrating an example target image.

FIG. 2 is an explanatory view illustrating an example target image. The illustrated image includes a line image (pattern) and a non-line image.

Figure 3:

FIG. 3 is an explanatory view illustrating an example image (pixel data) obtained when a scanner or the like reads the images illustrated in FIG. 2. In this example, a line to be extracted may not be necessarily represented as a single region, which may be regarded as a straight line, in a target image due to an effect of noise, dotted lines, dashed lines, non-line patterns, and the like read by the scanner or the like. More specifically, there may occur crushed or deficient lines and the like.

Figure 4:
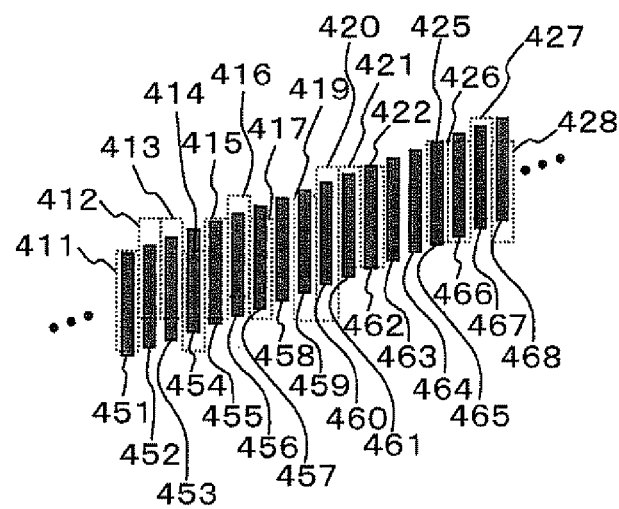
FIG. 4 is an explanatory view illustrating an example of line extraction.

FIG. 4 is an explanatory view illustrating an example of line extraction.

In this example, a line is identified as a set of regions corresponding to pixel runs extending in a direction intersecting (for example, perpendicular to) a line direction. Hereinafter, these regions are called "line elements."

The first embodiment involves detecting and integrating pixel runs corresponding to lines to be extracted (that is, observed line elements), as shown in the example of FIG. 4. A result of integration of pixel runs corresponds to a line image.

In addition, real line elements (that is, corrected line elements) may be generated based on these pixel runs. For example, in FIG. 4, observation line elements 411 to 428 indicated by dotted lines correspond to line elements observed within an image and correction line elements 451 to 468 indicated by gray rectangles correspond to line elements corrected based on the observation line element 411 and the like. For example, while the observation line element 411 is equal to the correction line element 451, the observation line element 412 moves downward to correspond to the correction line element 452 and the observation line element 414 moves upward to correspond to the correction line element 454. In addition, while there is no line element observed between the observation line element 422 and the observation line element 425, the correction line element 463 and the correction line element 464 are added.

Next, line elements will be described.

Figure 5:
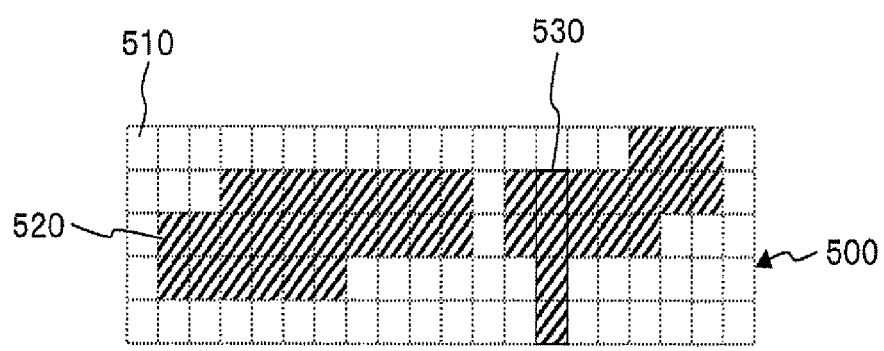
FIG. 5 is an explanatory view illustrating an example received image.

FIG. 5 is an explanatory view illustrating an example received image. A received image 500 is divided into background pixels 510 and pattern pixels 520 which are constituted by pixel runs 530 and the like. An example of extracting a horizontal line from this image 500 will be described below.

Figure 6:
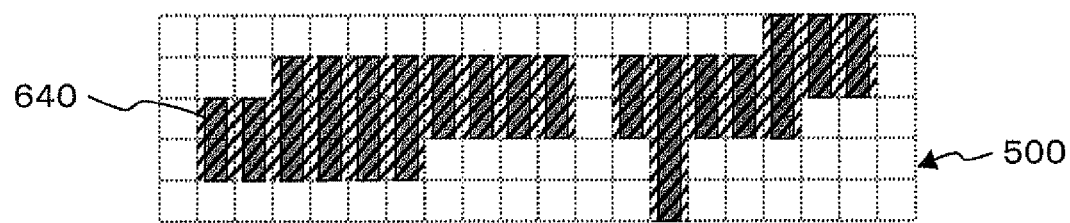
FIG. 6 is an explanatory view illustrating an example line element extracted from a received image.

FIG. 6 is an explanatory view illustrating an example line element extracted from the received image. The pattern pixels 520 are constituted by a set of line elements 640 and the like. In this example, a line element refers to a region corresponding to a rectangular pixel lump which may constitute a line, or the above-described pixel runs. An example of "information indicating line element" may include information used to draw a line element, specifically, a line element drawing position, a line element size, and the like.

Figure 7:
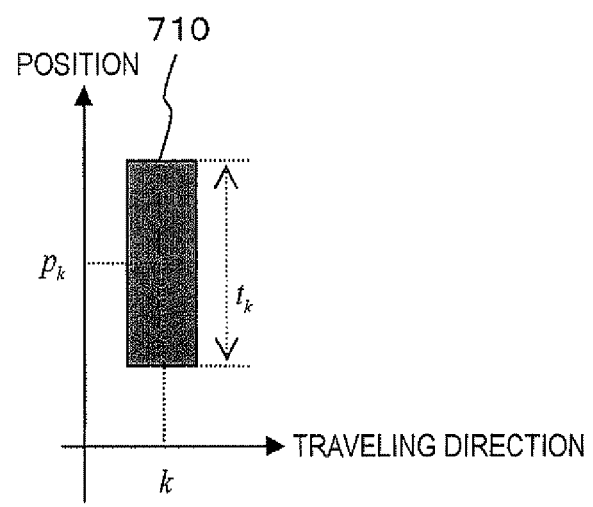
FIG. 7 is an explanatory view illustrating an example line element.

FIG. 7 is an explanatory view illustrating an example line element 710. In this example, a line element refers to one region corresponding to a pixel run extending in a direction (a position direction in FIG. 7) intersecting a line direction (a traveling direction in FIG. 7).

Assuming that a line is constituted by a plurality of line elements, for example, a k-th line element has the following information:

$t_k$: line element thickness $P_k$: line element position $t_k$ represents information on a line element shape and corresponds to a length in a direction intersecting the line direction. That is, $t_k$ is information corresponding to a line thickness.

$P_k$ represents position information. For example, for a horizontal line, $P_k$ is information corresponding to an image height.

As shown in the example of FIG. 7, a line element actually observed from an image has the minimum unit of one pixel. However, the minimum information unit of a line element may not necessarily be one pixel but may be a unit of less than one pixel. For example, a real line element may be obtained in the unit of less than one pixel based on an obtained line element. Alternatively, a line element may be generated from a state where there is no observed line element, such as line extraction including a correction process to supplement a line element in a halfway-cut portion, which is illustrated in FIG. 8.

Figure 8:
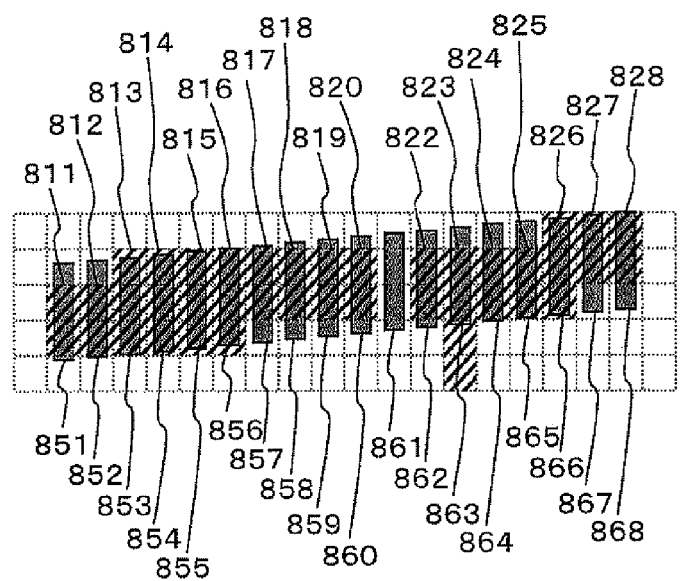
FIG. 8 is an explanatory view illustrating an example corrected and supplemented line element.

FIG. 8 is an explanatory view illustrating an example corrected and supplemented line element. In this figure, observation line elements 811 to 828 indicated by hatched rectangles correspond to line elements observed within an image and correction line elements 851 to 868 indicated by gray rectangles correspond to line elements corrected based on the observation line element 811 and the like. For example, while there is no line element observed between the observation line element 820 and the observation line element 822, the correction line element 861 is added.

In addition, not all the above-described information may necessarily be used. For example, if a line position is used by line extraction which will be described later, position information on individual line elements is unnecessary.

In addition, if multi-valued images are handled, pixel concentration information may be provided. For example, a line element whose color information is suddenly changed may be determined as observation failure.

Figure 9:
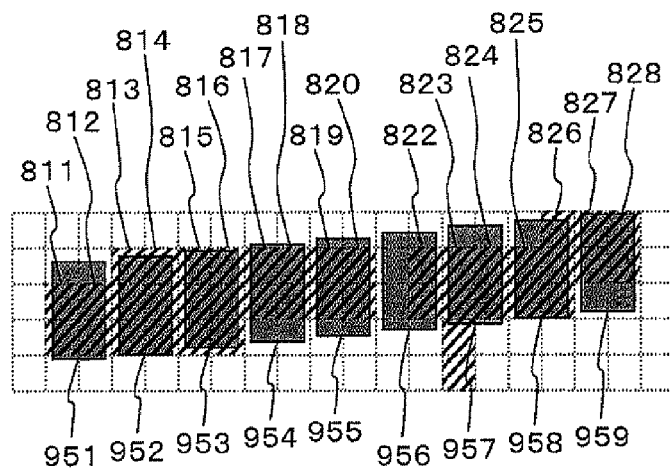
FIG. 9 is an explanatory view illustrating an example line element spanning over a plurality of pixels.

In addition, a line element may be connected to a plurality of pixels, as illustrated in FIG. 9. For example, an observation line element may correspond to one pixel and a correction line element may correspond to a plurality of pixels. In FIG. 9, observation line elements 811 to 828 indicated by hatched rectangles correspond to line elements observed within an image and correction line elements 951 to 959 indicated by gray rectangles correspond to line elements corrected based on the observation line element 811 and the like. For example, a pair of the observation line element 811 and the observation line element 812 moves upward to correspond to the correction line element 951, and, while there is no line element observed between the observation line element 820 and the observation line element 822, the correction line element 956 is additionally generated.

The line information reception module 110 is connected to the observation failure analysis module 120 and the feature amount calculation module 130. The line information reception module 110 receives line information 108 and delivers line information 112 to the observation failure analysis module 120 and the feature amount calculation module 130. The line information 108 refers to information on an image having the possibility of being lines and corresponds to a set of information indicating line element. The first embodiment involves determining whether or not the line information 108 constitutes a line.

The observation failure analysis module 120 (which is a prediction determination unit) is connected to the line information reception module 110 and the feature amount calculation module 130. The observation failure analysis module 120 determines whether the line information 112 is successfully or unsuccessfully observed and delivers observation failure information 122 to the feature amount calculation module 130. The observation failure analysis module 120 determines whether or not a target line element matches a predicted value of the line element if the line element is predicted to constitute a line at a position of the line element. Such determination on whether or not a target line element matches a predicted value of the line element if the line element is predicted to constitute a line at a position of the line element is also referred to as "observation." "Observation success" refers to a determination made that matches a predicted value and "observation failure" refers to a determination made that does not match a predicted value.

In addition, for observation failure, the observation failure analysis module 120 may also output a type of failure as the observation failure information 122.

A process performed by the observation failure analysis module 120 will now be described in detail.

The observation failure analysis module 120 receives the line information 112 and outputs the observation failure information 122 which is information of observation failure having types.

Figure 10:
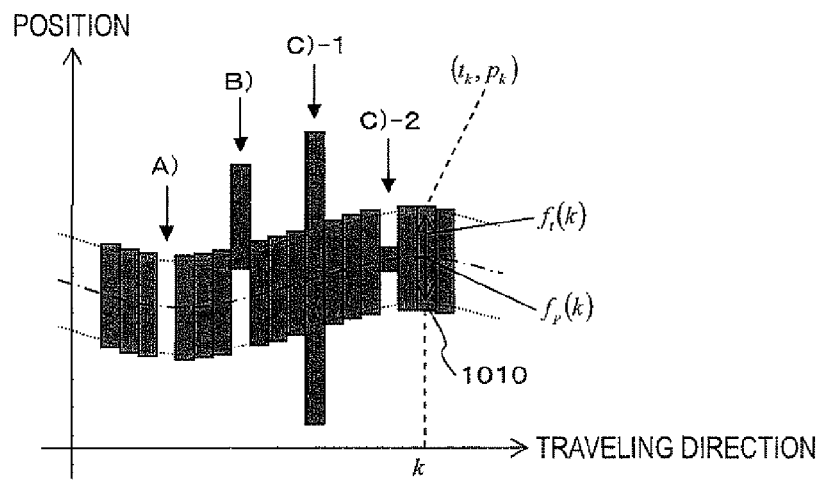
FIG. 10 is an explanatory view illustrating examples of determination and type of observation failures.

As illustrated in FIG. 10, a line constituted by line elements extending in a traveling direction is considered. In this example, the following information is obtained from the line information 108.

$f_t(k)$: line thickness at position k
$f_p(k)$: line position at position k
$f_t(k)$ and $f_p(k)$ correspond to an ideal value of a line element at position k.

In this case, line element thickness $t_k$ at position k is not necessarily equal to $f_t(k)$.

In addition, line element position $p_k$ at position k is not necessarily equal to $f_p(k)$.

In addition, in some cases, there is no line element at position k.

Accordingly, a line element at position k may have the following types of observation failure:

A) No line element is present.
B) A difference between $p_k$ and $f_p(k)$ is larger than a preset threshold.
C) A difference between $t_k$ and $f_t(k)$ is larger than a preset threshold.

These types of observation failure will be described in detail by using the example of FIG. 10. In FIG. 10, gray rectangles represent line elements (observed line elements) indicated by the line information 112. A region (line) surrounded by top and bottom dotted lines represents an ideal line calculated based on the line information 112 and a one-dot chain line represents the center of the ideal line.

In the example of FIG. 10, there is no line element in the next place of third line element (a position indicated by A) from the leftmost. This is an example of observation failure (A).

In the example of FIG. 10, the seventh line element (a position indicated by B) from the leftmost protrudes upward, which means that a difference between $p_k$ and $f_p(k)$ is larger than a preset threshold. This is an example of observation failure (B).

The type of observation failure is different depending on whether a difference between $t_k$ and $f_t(k)$ is positive or negative. In the example of FIG. 10, the eleventh line element (a position indicated by C-1) from the leftmost is too thicker than line elements of the ideal line. On the contrary, in the example of FIG. 10, the fifteenth line element (a position indicated by C-2) from the leftmost is too thinner than the line elements of the ideal line.

To cope with these types of observation failure, the observation failure analysis module 120 has several conditions for determining whether or not matching to a predicted value occurs.

This first condition is that a line element is present next a target line element. This corresponds to the above type A). Dissatisfaction of this condition results in the first type of observation failure.

The second condition is that a difference between a position of an observed line element and a position of a predicted line element is smaller than a threshold. This corresponds to the above type B). If this difference is equal to or larger than the threshold, this results in the second type of observation failure.

The third condition is that a difference between a width of an observed line element and a width of a predicted line element is smaller than a threshold. This corresponds to the above type C). If this difference is equal to or larger than the threshold, this results in the third type of observation failure. If this difference is smaller than the threshold, this results in the fourth type of observation failure.

The above-mentioned thresholds may be set to constant, an integral multiple of $f_p(k)$, an integral multiple of $f_t(k)$, or an integral multiple of variance of line elements.

The observation failure analysis module 120 may output observation with addition of types such as A), B), C)-1 and C)-2.

$f_t(k)$ and $f_p(k)$ may be obtained in existing ways. For example, $f_t(k)$ may be obtained as a mean value, a medium value or the maximum frequency of observed line information 112. $f_p(k)$ may be obtained by a minimum square error function from positions of the observed line information 112.

In addition, not all line elements may necessarily be used to obtain $f_t(k)$ and $f_p(k)$. For example, $f_t(k)$ and $f_p(k)$ for a line element to be determined may refer to neighboring line elements. The neighborhood used herein refers to that neighboring line elements exist within a predetermined distance from a target line element. In addition, remaining line element except line elements resulting in apparent observation failure may be referred to.

Further, in addition to the above types of observation failure, other types of observation failure with reference to concentration information of line elements may be provided.

The observation failure analysis module 120 may be divided into two modules.

The first module is a predicted value calculation module which calculates a predicted value of information on line elements at a target position if the line elements constitute a line from the target line element position, based on the information on the line elements received by the line information reception module 110.

The second module is a prediction determination processing module which determines whether or not the predicted value calculated by the predicted value calculation module matches the information on the line elements received by the line information reception module 110.

In addition, the observation failure analysis module 120 may classify no matching to a predicted value depending on types.

The feature amount calculation module 130 is connected to the line information reception module 110, the observation failure analysis module 120 and the employment determination module 140. The feature amount calculation module 130 calculates feature amount of the line information 112 corresponding to the observation failure information 122 and delivers the feature amount 132 to the employment determination module 140. The feature amount calculation module 130 calculates a feature of an image regarding the determination by the observation failure analysis module 120 that no matching to a predicted value occurs. In addition, the feature amount calculation module 130 may extract a feature based on the type of conditions on the determination by the observation failure analysis module 120 that no matching to a predicted value occurs. Specifically, the feature may be the incidence of no matching to a predicted value (observation failure).

The feature amount calculation module 130 obtains line feature amount with reference to the line information 112 and the observation failure information 122. For each of types of observation failure or by arranging several types of observation failure, the incidence of observation failure is obtained as feature amount.

Specifically, this is obtained as follows:

First, the types of observation failure are arranged according to the following equations (1) and (2). In the equations, n{X} represents the number of incidence of a type X of observation failure. A method of arranging the types of observation failure is not limited to Equations (1) and (2). For example, n{$C_2$} may be added to thick_skip. In addition, the types of observation failure may not be necessarily arranged.

[Equation 1]

$$\text{blank\_skip} = n\{A\} + n\{B\} + n\{C_2\} \quad (1)$$

A: No line element
B: Thickness of line element is too thin
$C_2$: Position of line element is too distant from predicted one

[Equation 2]

$$\text{thick\_skip} = n\{C_1\} \quad (2)$$

$C_1$: Thickness of line element is too fat

Assuming that the total number of line elements constituting a line, the incidence of types of observation failure, that is feature amount, is obtained according to the following equations (3) and (4).

[Equation 3]

$$\text{ratio\_blank\_skip} = \text{blank\_skip}/N \quad (3)$$

[Equation 4]

$$\text{ratio\_thick\_skip} = \text{thick\_skip}/N \quad (4)$$

Here, instead of using the types of observation failure, features different from Equations (3) and (4) may be obtained. There are, for example, length, thickness, position, gradient, distortion, accumulation of errors of $f_t(k)$ and $t_k$ (i.e., thickness) and errors of $f_p(k)$ and $p_k$ (i.e., position). In this case, except line elements resulting in observation failure, the above-mentioned feature amounts may be obtained.

The employment determination module 140 (which is a line determination unit) is connected to the feature amount calculation module 130. The employment determination module 140 determinates whether or not a line element is employed as a line based on the feature amount 132 and outputs employment/unemployment 142. Here, an example of outputting may include storing on a storage medium such as a memory card, transfer to another information processing apparatus, and the like.

The employment determination module 140 determines whether or not an image constituted by the line information 108 received by the line information reception module 110 is a line based on the feature amount 132 calculated by the feature amount calculation module 130.

Figure 11:
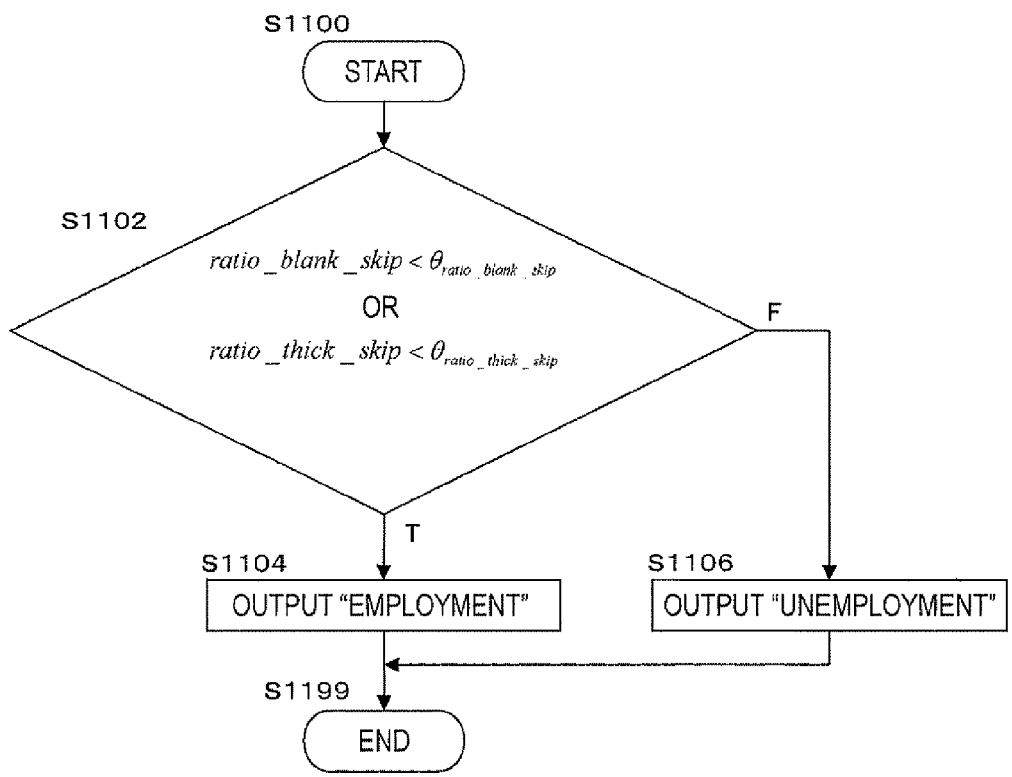
FIG. 11 is a flow chart illustrating an example process performed by an employment determination module.

The employment determination module 140 outputs information of the line employment/unemployment 142 based on the line feature amount 132. In this case, a determination may be made whether or not each feature satisfies a predetermined condition. For example, a determination process shown in an example of FIG. 11 is performed. In FIG. 11, $\theta_{ratio\_blank\_skip}$ and $\theta_{ratio\_thick\_skip}$ are predetermined values.

In addition, a determiner may be generated by learning from the feature amount. In this case, feature amounts of different lines may be used. That is, this process is configured by a two-class classifier with at least line feature amount regarding the type of observation failure as an input.

FIG. 11 is a flow chart illustrating an example process performed by the employment determination module 140.

At Step S1102, it is determined whether or not the following equation (5) or (6) is established. If so, the process proceeds to Step S1104, or otherwise, the process proceeds to Step S1106.

[Equation 5]

$$\text{ratio\_blank\_skip} < \theta_{ratio\_blank\_skip} \quad (5)$$

[Equation 6]

$$\text{ratio\_thick\_skip} < \theta_{ratio\_thick\_skip} \quad (6)$$

At Step S1104, "employment" is output.
At Step S1106, "unemployment" is output.

For the type of observation failure, it is characterized that a solid line has less blank_skip and more thick_skip while a dashed line has less thick_skip and more blank_skip. In addition, it is caharacterized that a non-line pattern has much thick_skip and blank_skip. Accordingly, by using the type of observation failure, it is possible to extract a line without erroneously extracting a non-line pattern when extracting a line from an image in which solid lines, deficient lines, crushed lines, line intersections, non-line patterns and so on are mixed.

In addition, if the incidence of observation failure is equal to or less than a predetermined value, a determination may be made whether a line is employed irrespective of subsequent determination or a threshold for subsequent determination is updated. This may result in high probability of line employment if an extracted line is successfully observed.

Figure 12:
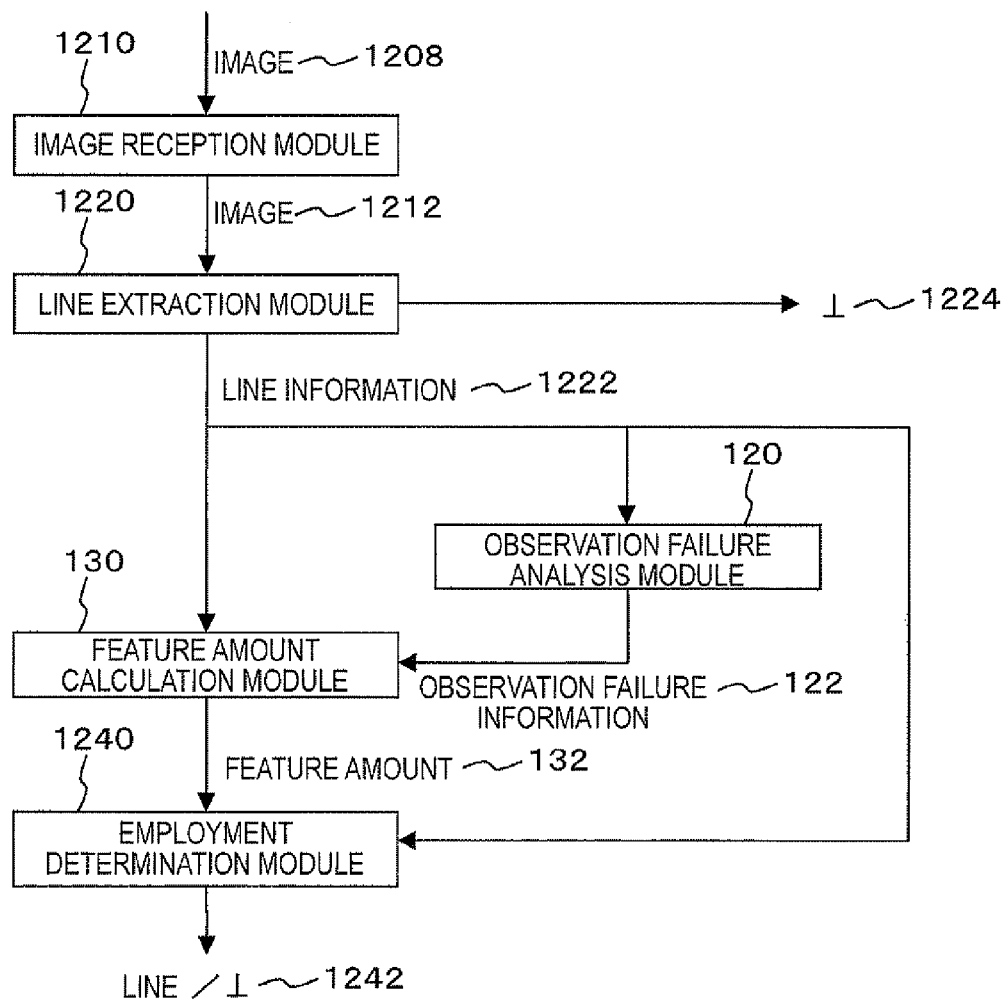
FIG. 12 is a conceptual module configuration view of an example configuration according to a second embodiment.

FIG. 12 is a conceptual module configuration view of an example configuration according to a second embodiment.

The configuration of the second embodiment includes an image reception module 1210, a line extraction module 1220, an observation failure analysis module 120, a feature amount calculation module 130 and an employment determination module 1240. The same modules as the first embodiment are denoted by the same reference numerals, and explanation thereof will not be repeated. Even for modules denoted by the same reference numerals, the following description is in regard to addition or substitution of performance or function of modules corresponding to the first embodiment. This is equally applied to third and subsequent embodiments.

The image reception module 1210 is connected to the line extraction module 1220. The image reception module 1210 receives an image 1208 and delivers an image 1212 to the line extraction module 1220.

The line extraction module 1220 is connected to the image reception module 1210, the observation failure analysis module 120, the feature amount calculation module 130 and the employment determination module 1240. The line extraction module 1220 extracts a line by aligning line elements from the image 1212, delivers line information 1222 to the observation failure analysis module 120, the feature amount calculation module 130 and the employment determination module 1240, and outputs an invalid signal 1224 if there is no line in the image 1212. The line extraction module 1220 extracts an image, which is likely to be a line, from the image 1212 received by the image reception module 1210 and extracts the line information 1222 which is a set of information indicating line element of the line. This line extraction process may use the existing techniques disclosed in JP-A-08-016782 and so on.

The observation failure analysis module 120 is connected to the line extraction module 1220 and the feature amount calculation module 130. The observation failure analysis module 120 receives the line information 1222, which is a set of information indicating the line elements extracted by the line extraction module 1220, makes a determination on observation success/failure of the line information 1222, and delivers observation failure information 122 to the feature amount calculation module 130. In this case, for observation failure, types of observation failure may be output together.

The feature amount calculation module 130 is connected to the line extraction module 1220, the observation failure analysis module 120 and the employment determination module 1240. The feature amount calculation module 130 receives the line information 1222, which is a set of information indicating the line elements extracted by the line extraction module 1220, and the observation failure information 122 from the observation failure analysis module 120, calculates feature amount of the line information 1222 corresponding to the observation failure information 122, and delivers a feature amount 132 to the employment determination module 1240. Here, other feature amounts may be calculated.

The employment determination module 1240 is connected to the line extraction module 1220 and the feature amount calculation module 130. The employment determination module 1240 determines whether or not an image is employed as a line based on the feature amount 132, and outputs a line/invalid signal 1242. That is, information indicating a line is output for employment, while an invalid signal ⊥ is output for unemployment.

Figure 13:
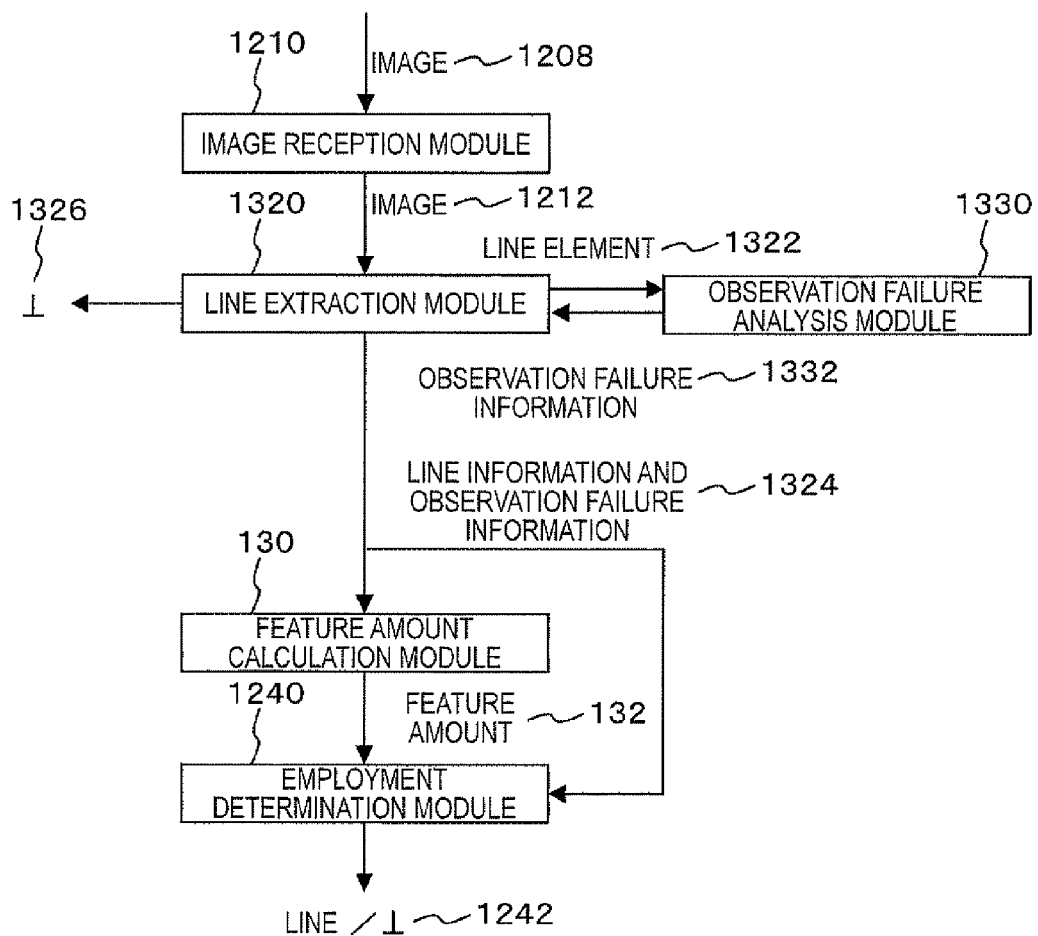
FIG. 13 is a conceptual module configuration view of an example configuration according to a third embodiment.

FIG. 13 is a conceptual module configuration view of an example configuration according to a third embodiment.

The configuration of the third embodiment includes an image reception module 1210, a line extraction module 1320, an observation failure analysis module 1330, a feature amount calculation module 130 and an employment determination module 1240. The observation failure analysis module 1330 may be integrated with the line extraction module 1320. That is, for line extraction, in the course of integrating line elements, observation failure analysis may be performed in order whenever a line element is acquired. In comparison with the example of FIG. 12 of the second embodiment, there is no need to make repeated observation failure analysis, which may result in an increase in a process speed. Further, since unnecessary line elements resulting in observation failure are excluded, memory efficiency may be improved.

The image reception module 1210 is connected to the line extraction module 1320. The image reception module 1210 receives an image 1208 and delivers an image 1212 to the line extraction module 1320.

The line extraction module 1320 is connected to the image reception module 1210, the observation failure analysis module 1330, the feature amount calculation module 130 and the employment determination module 1240. The observation failure analysis module 1330 is connected to the line extraction module 1320. In the course of integrating line elements in the line extraction module 1320, the observation failure analysis module 1330 performs the above-described observation failure analysis process in order whenever a line element 1322 is acquired from the image 1212. In addition, the line extraction module 1320 receives observation failure information 1332 from the observation failure analysis module 1330. Finally, the line extraction module 1320 outputs an invalid signal 1326 if there is no line in the image 1212, and delivers line information and observation failure information 1324 to the feature amount calculation module 130 and the employment determination module 1240 if there is an image which is likely to be a line.

The feature amount calculation module 130 is connected to the line extraction module 1320 and the employment determination module 1240. The feature amount calculation module 130 receives the line information and observation failure information 1324 from the line extraction module 1320 and calculates feature amount of the image.

The employment determination module 1240 is connected to the line extraction module 1320 and the feature amount calculation module 130. The employment determination module 1240 receives the line information and observation failure information 1324 from the line extraction module 1320 and the feature amount 132 from the feature amount calculation module 130 and outputs a line/invalid signal 1242.

Figure 14:
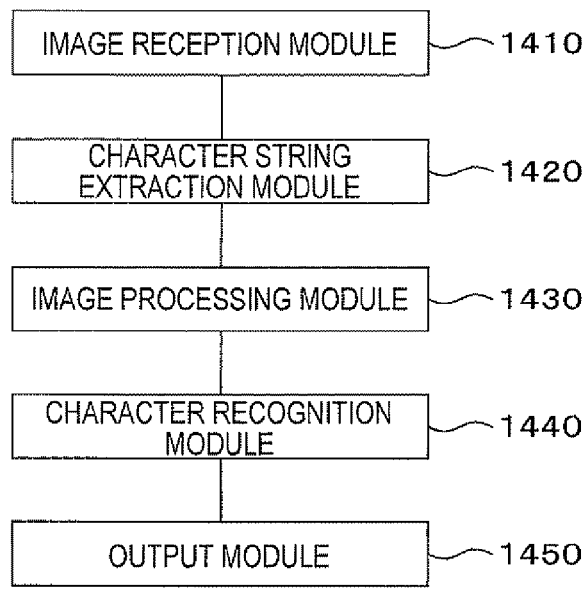
FIG. 14 is a conceptual module configuration view of an example configuration according to a fourth embodiment.

FIG. 14 is a conceptual module configuration view of an example configuration according to a fourth embodiment.

The configuration of the fourth embodiment includes an image reception module 1410, a character string extraction module 1420, an image processing module 1430, a character recognition module 1440 and an output module 1450.

The image reception module 1410 is connected to the character string extraction module 1420. The image reception module 1410 receives an image including a character string. The image may also include an underline, a cancellation line and so on.

The character string extraction module 1420 is connected to the image reception module 1410 and the image processing module 1430. The character string extraction module 1420 extracts a character string from the image received by the image reception module 1410 and extracts an image having a possibility of being line, based on a direction of the character string. The character string extraction may use existing techniques. For example, histograms of black pixels in vertical and horizontal directions may be taken and directions of vertical-writing and horizontal-writing may be extracted from a distribution of the histograms. An image which is likely to be a line is extracted with the direction of the character string as a line direction.

The image processing module 1430 is connected to the character string extraction module 1420 and the character recognition module 1440 and corresponds to one of the image processing apparatus of the first embodiment, the image processing apparatus of the second embodiment and the image processing apparatus of the third embodiment. That is, it is determined whether or not the image extracted by the character string extraction module 1420, which is likely to be a line, is a line.

The character recognition module 1440 is connected to the image processing module 1430 and the output module 1450. The character recognition module 1440 erases an image determined as a line from the image by the image processing module 1430 and recognizes only a character image.

The output module 1450 is connected to the character recognition module 1440 and outputs a result of character recognition by the character recognition module 1440.

Figure 15:
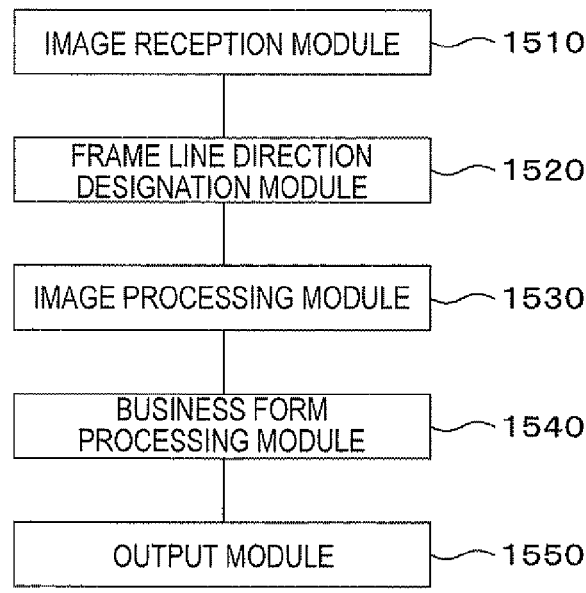
FIG. 15 is a conceptual module configuration view of an example configuration according to a fifth embodiment.

FIG. 15 is a conceptual module configuration view of an example configuration according to a fifth embodiment.

The configuration of the fifth embodiment includes an image reception module 1510, a frame line direction designation module 1520, an image processing module 1530, a business form processing module 1540 and an output module 1550.

The image reception module 1510 is connected to the frame line direction designation module 1520 and receives an image including a frame line, such as, for example, a business form image.

The frame line direction designation module 1520 is connected to the image reception module 1510 and the image processing module 1530 and extracts an image having a possibility of being line, from the image received by the image reception module 1510 based on a direction of the frame line. For example, the frame line direction designation module 1520 designates and extracts lines in vertical and horizontal directions, which are mainly used in business forms, and extracts an image which is likely to be a line.

The image processing module 1530 is connected to the frame line direction designation module 1520 and the business form processing module 1540 and corresponds to one of the image processing apparatus of the first embodiment, the image processing apparatus of the second embodiment and the image processing apparatus of the third embodiment. That is, it is determined whether or not the image extracted by the frame line direction designation module 1520, which is likely to be a line, is a line.

The business form processing module 1540 is connected to the image processing module 1530 and the output module 1550. The business form processing module 1540 determines columns in the business form from positions of line images determined as lines from the image by the image processing module 1530, and recognizes character image in the columns, thereby associating the determined columns with a character recognition result.

The output module 1550 is connected to the business form processing module 1540 and outputs a result of business form process by the business form processing module 1540.

Now, an example of hardware configuration of the image processing apparatus of this embodiment will be described with reference to FIG. 16. The hardware configuration shown in FIG. 16 is configured by, for example, a personal computer (PC) or the like, including a data reading unit 1617 such as a scanner or the like, a data output unit 1618 such as a printer or the like.

A central processing unit (CPU) 1601 is a control unit for executing a process according to a computer program describing an execution sequence of various modules described in the above embodiment, such as the line information reception module 110, the observation failure analysis module 120, the feature amount calculation module 130, the employment determination module 140, the image reception module 1210, the line extraction module 1220, the employment determination module 1240, the line extraction module 1320, the observation failure analysis module 1330, the character string extraction module 1420, the image processing module 1430, the character recognition module 1440, the frame line direction designation module 1520, the image processing module 1530, the business form processing module 1540 and so on.

A read only memory (ROM) 1602 stores programs, operation parameters and so on used by the CPU 1601. A random access memory (RAM) 1603 stores programs used for execution by the CPU 1601, parameters properly changed for the execution, etc. These memories are interconnected via a host bus 1604 such as a CPU bus or the like.

The host bus 1604 is connected to an external bus 1606 such as a peripheral component interconnect/interface (PCI) bus or the like via a bridge 1605.

A point device 1609 such as a keyboard 1608, a mouse or the like is an input device manipulated by an operator. A display 1610, such as a liquid crystal display apparatus, a cathode ray tube (CRT) or the like, displays various kinds of information as text or image information.

A hard disk drive (HDD) 1611 contains a hard disk and drives the hard disk to record or reproduce programs or information executed by the CPU 1601. The hard disk stores target images, information indicating line element, results of the determination, etc. In addition, the hard disk stores various kinds of computer programs such as data processing programs.

A drive 1612 reads data or programs recorded in a removable recording medium 1613 mounted thereon, such as a magnetic disk, an optical disk, a magneto-optical disk, a semiconductor memory or the like, and supplies the read data or programs to the RAM 1603 via an interface 1607, the external bus 1606, the bridge 1605 and the host bus 1604. The removable recording medium 1613 may also be used as a data recording region like the hard disk.

A connection port 1614 is a port which is connected to an external connection device 1615 and includes a connection unit such as a USB, IEEE1394 or the like. The connection port 1614 is also connected to the CPU 1601 and so on via the interface 1607, the external bus 1606, the bridge 1605, the host bus 1604 and so on. A communication unit 1616 is connected to a network for conducting data communication with the external. The data reading unit 1617 is, for example, a scanner for reading a document. The data output unit 1618 is, for example, a printer for outputting document data.

The hardware configuration of the image processing apparatus shown in FIG. 16 is a example of the configuration, and this embodiment is not limited to the hardware configuration shown in FIG. 16 but may have any configuration as long as it can execute the modules described in this embodiment. For example, some modules may be configured as a dedicated hardware (for example, ASIC (Application Specific Integrated Circuit) or the like), some modules may be in an external system and connected via a communication link, and additionally a plurality of the system shown in FIG. 16 may be interconnected via a communication link to cooperate between them. In addition, the hardware configuration may be assembled in a copier, facsimile, scanner, printer, a multifunction copier (image processing apparatus having two or more of functions of scanner, printer, copier and facsimile and the like), etc.

The above-described various embodiments may be combined (for example, including adding modules in one embodiment to another embodiment or substituting them with those in another embodiment), or the techniques described in the [Background Art] may be employed as contents of processing of various modules.

The above-described program may be stored in a recording medium or may be provided by communication means. In this case, for example, the above-described program may be understood as the invention of "computer-readable recording medium having a program recorded thereon."

"Computer-readable recording medium having a program recorded thereon" refers to a computer-readable recording medium having a program recorded thereon, which is used for installation, execution, distribution and so on of the program.

The recording medium may include, for example, a digital versatile disc (DVD) such as "DVR-R, DVD-RW, DVD-RAM and the like", which are a standard specified by DVD Forum, and "DVD+R, DVD+RW and the like", which are a standard specified as DVD+RW, a compact disc (CD) such as read-only memory (CD-ROM), CD recordable (CD-R), CD rewritable (CD-RW) or the like, a blue-ray disc (trade mark), a magneto-optical disc (MO), a flexible disc (FD), a magnetic tape, a hard disk, a read only memory (ROM), an electrically erasable programmable read-only memory (EEPROM (trade mark)), a flash memory, a random access memory (RAM), or the like.

The program or a part thereof may be recorded in the recording medium for storage and distribution. In addition, the program or a part thereof may be transmitted via communication means, for example, a transmission medium such as a wired network or a wireless network used for a local area network (LAN), metropolitan area network (MAN), wide area network (WAN), Internet, intranet, extranet and so on, or further a combination thereof, or may be carried using a carrier wave.

The program may be a part of other program or may be recorded in the recording medium along with a separate program. In addition, the program may be divided and recorded in a plurality of recording media. In addition, the program may be recorded in any form including compression, encryption and so on as long as it can be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising a processor, the processor configured to function as:
    a line information reception unit that receives a set of information indicating (i) information on an image having a possibility of being a line and (ii) a line element being a rectangular pixel lump which constitutes a line;
    a prediction determination unit that determines whether or not each target line element in the image matches a predicted value of the target line element based on the information indicating the line element received by the line information reception unit, the predicted value indicating a line element which is predicted when the target line element constitutes a line at a position of the target line element;
    a feature amount calculation unit that calculates a feature amount of the image when the prediction determination unit determines the target line element does not match the predicted value, the feature amount of the image being calculated as equal to a number of observation failures divided by the number of target line elements; and
    a line determination unit that determines whether or not the image is a line based on the feature amount calculated by the feature amount calculation unit, wherein
    an observation failure exists when (a) the line element is not at the position of the target line element, (b) the target line element has a thickness less than a predetermined threshold, or (c) the position of the target line element is too distant from a predicted position of the target line element.

2. The image processing apparatus according to claim 1, further comprising:
    an image reception unit that receives the image; and
    a line extraction unit that extracts an image having a possibility of being a line from the image received by the image reception unit and that extracts a set of information indicating a line element of the line,
    wherein the line information reception unit receives the set of information indicating the line element extracted by the line extraction unit.

3. The image processing apparatus according to claim 1, wherein the prediction determination unit has a plurality of conditions to determine whether or not the target line element matches the predicted value, and
    wherein the feature amount calculation unit extracts the feature amount based on a type of the conditions when the prediction determination unit determines the target line element does not match the predicted value.

4. The image processing apparatus according to claim 2, wherein the image reception unit receives an image including a character string, and
    wherein the line extraction unit extracts an image having a possibility of being a line based on a direction of the character string from the image received by the image reception unit.

5. The image processing apparatus according to claim 2, wherein the image reception unit receives an image including a frame line, and
    wherein the line extraction unit extracts an image having a possibility of being a line based on a direction of the frame line from the image received by the image reception unit.

6. An image processing method comprising:
    receiving a set of information indicating (i) information on an image having a possibility of being a line and (ii) a line element being a rectangular pixel lump which constitutes a line;
    determining whether or not each target line element in the image matches a predicted value of the target line element based on the received information indicating the line element, the predicted value indicating a line element which is predicted when the target line element constitutes a line at a position of the target line element;
    calculating a feature amount of the image when it is determined that the target line element does not match the predicted value, the feature amount of the image being calculated as equal to a number of observation failures divided by the number of target line elements; and determining whether or not the image is a line based on the calculated feature amount, wherein
an observation failure exists when (a) the line element is not at the position of the target line element, (b) the target line element has a thickness less than a predetermined threshold, or (c) position of the target line element is too distant from a predicted position of the target line element.

7. A non-transitory computer-readable medium storing a program that causes a computer to execute image processing, the image processing comprising:
  receiving a set of information indicating (i) information on an image having a possibility of being a line and (ii) a line element being a rectangular pixel lump which constitutes a line;
  determining whether or not each target line element matches a predicted value of the target line element based on the received information indicating the line element, the predicted value indicating a line element which is predicted when the target line element constitutes a line at a position of the target line element;
  calculating a feature amount of the image when it is determined that the target line element does not match the predicted value, the feature amount of the image being calculated as equal to a number of observation failures divided by the number of target line elements; and
  determining whether or not the image is a line based on the calculated feature amount, wherein
an observation failure exists when (a) the line element is not at the position of the target line element, (b) the target line element has a thickness less than a predetermined threshold, or (c) the position of the target line element is too distant from a predicted position of the target line element.

* * * * *